(12) United States Patent  (10) Patent No.: US 8,695,342 B2
Fredriksson et al.  (45) Date of Patent: Apr. 15, 2014

(54) HEATING SYSTEM FOR A TURBINE

(75) Inventors: Mikael Fredriksson, Finspang (SE);
Torbjörn Johansson, Norrköping (SE);
Tommy Larsson, Finspong (SE); Oskar Mazur, Finspang (SE)

(73) Assignee: Siemens Aktiengesellschaft, Munich (DE)

( * ) Notice: Subject to any disclaimer, the term of this patent is extended or adjusted under 35 U.S.C. 154(b) by 311 days.

(21) Appl. No.: 12/987,356

(22) Filed: Jan. 10, 2011

(65) Prior Publication Data

US 2011/0167820 A1  Jul. 14, 2011

(30) Foreign Application Priority Data

Jan. 12, 2010  (EP) ...................................... 10000222

(51) Int. Cl.
*F01D 25/10* (2006.01)
*F01D 19/02* (2006.01)
*F01K 13/02* (2006.01)

(52) U.S. Cl.
CPC ............... *F01D 25/10* (2013.01); *F01D 19/02* (2013.01)
USPC .................................. 60/646; 60/657; 60/648

(58) Field of Classification Search
CPC ........... F01D 25/10; F01D 19/02; F01D 5/04; F01K 7/165
USPC ............................ 60/643–683, 641.1–641.15
See application file for complete search history.

(56) References Cited

U.S. PATENT DOCUMENTS

| 4,200,784 | A | * | 4/1980 | Albaric et al. | ................. | 219/470 |
| 4,282,708 | A | * | 8/1981 | Kuribayashi et al. | ........... | 60/778 |
| 4,362,149 | A | * | 12/1982 | Thomson | ..................... | 126/400 |
| 4,584,836 | A | * | 4/1986 | McClelland | ..................... | 60/646 |
| 4,651,532 | A | * | 3/1987 | Abe | ............................... | 60/646 |
| 5,018,356 | A | * | 5/1991 | Silvestri et al. | ................. | 60/646 |
| 5,498,131 | A | * | 3/1996 | Minto | ........................ | 415/216.1 |
| 2009/0288415 | A1 | * | 11/2009 | Gobrecht et al. | ............... | 60/646 |

FOREIGN PATENT DOCUMENTS

| EP | 0231952 | A2 | | 8/1987 |
| EP | 0318026 | | | 5/1989 |
| EP | 537307 | A1 | * | 4/1993 |
| EP | 1046787 | A2 | | 10/2000 |
| EP | 1674667 | A1 | | 6/2006 |
| EP | 1717419 | A1 | | 11/2006 |
| WO | WO 9855738 | A1 | | 12/1998 |

* cited by examiner

*Primary Examiner* — Thomas Denion
*Assistant Examiner* — Laert Dounis

(57) ABSTRACT

A turbine for converting thermal energy into mechanical work. The turbine includes a heating system, wherein the heating system is adapted for heating the turbine in a power off state and/or a start-up phase of the turbine. The heating system may include an electrical heating device and/or a steam heating device.

16 Claims, 1 Drawing Sheet

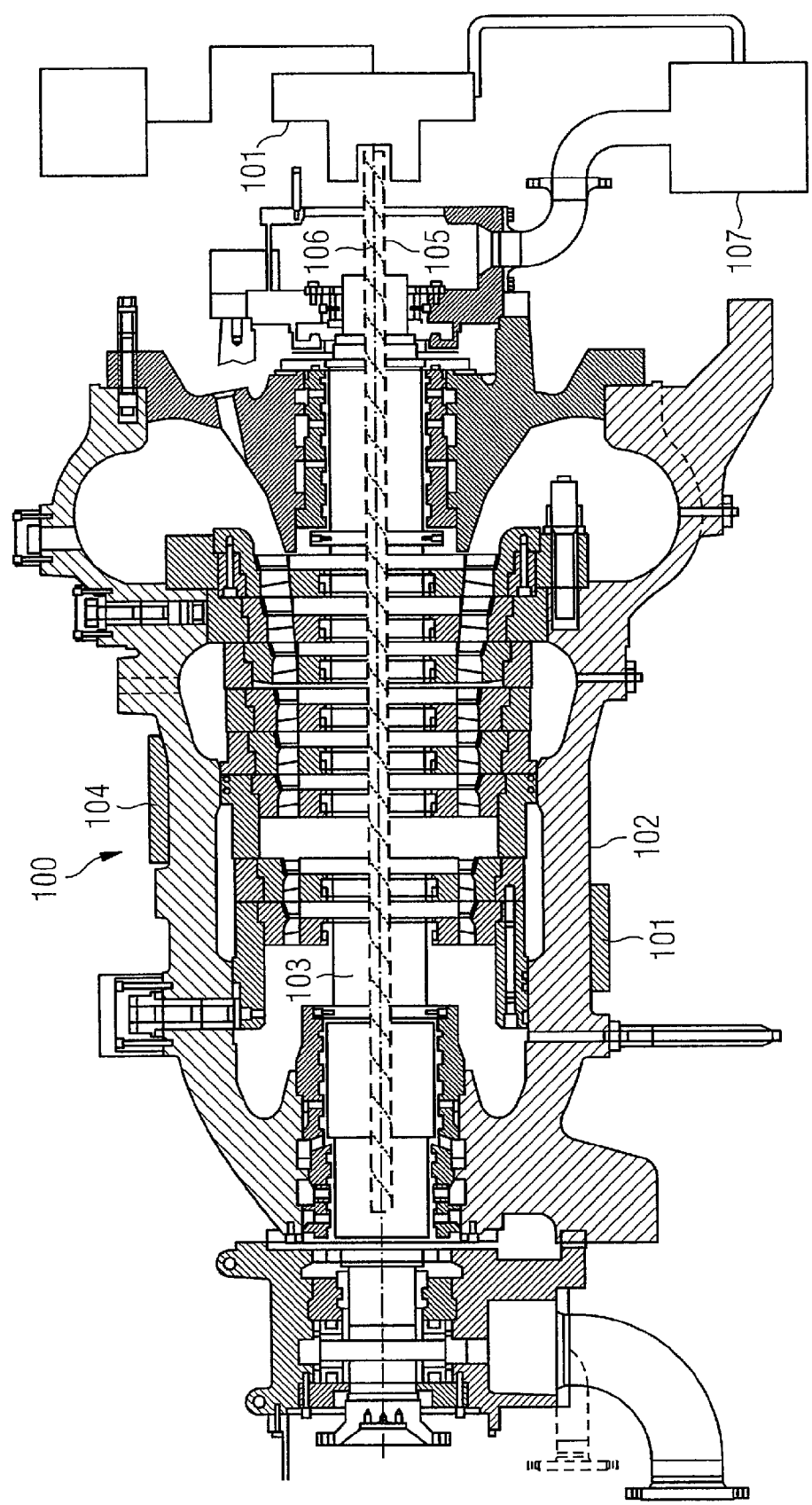

HEATING SYSTEM FOR A TURBINE

CROSS REFERENCE TO RELATED APPLICATIONS

This application claims priority of European Patent Office application No. 10000222.9 EP filed Jan. 12, 2010, which is incorporated by reference herein in its entirety.

FIELD OF INVENTION

The present invention relates to a turbine for converting thermal energy in mechanical work, to a solar power station comprising at least one turbine and to a method of operating a turbine for converting thermal energy in mechanical work.

ART BACKGROUND

In general, turbines, in particular steam turbines, for converting thermal energy in mechanical work are typically used in thermal power stations. The thermal power stations produce thermal energy by combustion of fossil material, by the use of nuclear reactors or by solar power, for instance. In conventional thermal power stations thermal energy may be produced 24 hours a day, so that the power generating turbines need not to be shut down under regular conditions.

A turbine that is cooled down and in a power off state requires a long start-up phase until the regular operating conditions of the turbine are reached. For instance, the rotation speed of the rotor blades in the turbine has to be accelerated slowly, so that disadvantageous operating conditions, such as the surge of the turbine, do not occur. Surging is defined as a self oscillation of the discharge and flow rate pressure of the turbine, including a flow reversal.

In modern times, it is an aim to produce more and more renewable energy from ecologically friendly energy sources. One exemplary power station that produces energy from an ecologically friendly energy source is the solar power station. In solar power stations electricity is generated by means of sunlight. A typical solar-thermal power station comprises solar collectors, such as parabolic reflectors, in order to concentrate sunlight to a small surface for generating heat. With the thermal energy generated by the sunlight a working medium for a turbine is heated up. The working medium may be a fluid, such as suitable oil materials or water, in a vapour or steam state. The heated steam is guided through the turbine that converts the thermal energy in mechanical work, wherein a subsequent generator converts the mechanical work in electricity.

Solar-thermal power stations only operate during day time when the sun is shining. During night time, the solar-thermal power stations are shut off and thus the turbines as well. During the night time, the turbines are cooling down to the ambient air temperature. At the next day, when the turbine is started again, a long start-up phase is necessary until the turbine reaches the operating temperature and thus an adequate efficiency.

The start-up phase of conventional turbines for solar power stations may endure up to 1 to 1.5 hours until the turbines reaching its operational state. Thus, the overall working time of the turbines during day time may be reduced by 1 to 1.5 hours which leads to a lack of productivity and efficiency of the overall solar power station.

SUMMARY OF THE INVENTION

It may be an object of the present invention to reduce a duration of a start-up phase of a turbine.

This object may be solved by a turbine for converting thermal energy in mechanical work, by a solar power station comprising at least one turbine and by a method of operating a turbine for converting thermal energy in mechanical work according to the independent claims.

According to a first aspect of the invention a turbine for converting thermal energy in mechanical work is provided. The turbine comprises a heating system. The heating system is adapted for heating the turbine in a power off state and/or a start-up phase of the turbine.

According to a further aspect of the present invention, a solar power station comprising at least one of the above-described turbines is provided.

According to a further aspect of the present invention, a method of operating a turbine for converting thermal energy in mechanical work is provided. According to the method, a turbine is heated with a heating system in a power off state and/or a start-up phase of the turbine.

The turbine may be defined as a turbine for converting thermal energy in mechanical work. In particular, the turbine may comprise a gas turbine or a steam turbine.

By the above-described turbine for converting thermal energy in mechanical work, the heating system of the turbine heats the turbine, if the turbine is in a power off state and/or a start-up phase. Thus, a certain minimum temperature of the components of the turbine may be kept constant, in particular during night time. The heating system is adapted for keeping the turbine components, in particular the rotor of the turbine, at the minimum temperature level that may be defined approximately between 100° and 600° Celsius, in particular approximately between 250° and 400° Celsius.

Thus, even when the ambient temperatures are very low during the night time, the turbine components are heated up and kept at the minimum temperature level. Thus, when starting the turbine in the next day, a difference between the temperature of the turbine components in an optimal operational state and the temperature at the minimum temperature level, that is kept constant by the heating system, is lower than without the heating system. Thus, the duration of the start-up phase may be reduced and thus the operational state of the turbine may be reached earlier. Thus, the overall efficiency of the solar power station may be improved.

Moreover, a further aspect of keeping the turbine component at a minimum temperature level is that the thermal deformation of the turbine components due to the temperature difference between the temperature at the operational state and the minimum temperature level is reduced in comparison to the turbine without the heating system. Stress and material fatigue may be reduced. Thus, the lifetime of the turbine may be improved.

According to a further exemplary embodiment the heating system comprises an electrical heating device. The electrical heating device may comprise electrical heating elements, such as heating coils or the like. The electrical heating device may be directly attached to some predefined turbine components for transferring thermal energy to the turbine.

According to a further exemplary embodiment of the present invention, the heating system comprises a steam heating device. The heating device may lead steam to internal surfaces of the shaft, so that the heat is traveling in a direction radially outwards with respect to the turbine shaft. The heated steam may transfer thermal energy to the adjacent internal surfaces of the turbine components.

The heating system may further comprise a hot air blower, wherein heated air may blow around the turbine components for heating purposes. The heating system may further comprise a heating device for providing hot oil e.g. into an internal hole of the shaft, i.e. to the internal surfaces of the shaft.

According to a further exemplary embodiment, the turbine further comprises a shaft with an internal hole. The heating system is connectable to the internal hole for heating the shaft, in particular from the inside. In particular the heating system is connectable to the internal hole in such a way that the heating system is thermally coupled to the internal hole, so that thermal energy may be transferred from the heating system into the internal hole. The internal hole may be aligned along the center axis of the shaft and in a coaxial direction of the shaft. Furthermore, the internal hole may comprise a radial direction with respect to the center axis of the shaft. When providing the internal hole inside the shaft, the thermal energy is transported to the center of the turbine. Due to convection of the thermal energy and because the outside of the turbine is much colder during night times than the heated inside of the turbine, the thermal energy moves from the internal shaft to the colder surrounding turbine components and finally to the environment of the turbine. Thus, the distribution of the thermal energy may be improved, because starting from the center of the turbine, an efficient distribution (convection) of the thermal energy from the inside of the turbine to the outside of the turbine may be provided. Thus, a more efficient heating of the turbine may be provided.

In the internal hole of the shaft, hot steam or hot air may be blown for transferring the thermal energy inside the shaft. Moreover, the internal hole may comprise heating elements for providing an electrical heating. The heating elements may comprise for instance heating coils or heated filaments, for example.

According to a further exemplary embodiment, the turbine further comprises a housing, wherein the heating system is connectable (thermally coupleable) to the housing. The outer surface of the housing may comprise heating coils that may be detachably mounted to the outer surface of the housing or that may be formed integrally to the outer turbine components, e.g. the housing of the turbine.

According to a further exemplary embodiment, the turbine further comprises an insulation system for insulating the turbine in such a way that the cooling rate of the turbine in the power off state is reduced.

The insulation system may comprise for instance insulating mats that are attached to the outer surface of the turbine in order to prevent the cooling-off of the turbine. Moreover, the insulation system may comprise heated insulating mats, so that the heated mats combine the heating system and the insulation system. The heated mats may comprise heating coils that may be heated by electrical power for instance. Thus, the outer surface of the turbine may be enveloped at least partially by the heated mats, so that the cooling-off rate of the turbine will be reduced and a defined minimum component temperature of the turbine components may be kept constant with less heating energy. The insulation system may furthermore comprise insulating materials that may be formed on the inner or outer surface of the turbine housing. The turbine housing may for instance comprise a coating or lamination including a damping material with proper damping characteristics, so that the housing may be formed integrally with the insulation system.

According to a further exemplary embodiment the heating system comprises a heat accumulator device. The heat accumulator device is adapted for storing thermal energy in particular during the daytime and/or when the turbine is running. The heat accumulator device is adapted for transferring thermal energy to the turbine, in particular to the heating system, during a power off state and/or a start-up phase of the turbine.

The heat accumulator device may comprise a molten salt thermal energy storage, wherein a volume of salt is melted by thermal energy from the sun or from the hot working fluid when the turbine is in an operational state. The liquid salt may be stored in an isolated storage tank. When the thermal energy is required by the heating system, the hot salt is used for transferring the thermal energy to the heating system. Instead of salt, it is also possible to store thermal energy in a steam heat accumulator wherein in an isolated steam pressure tank steam under pressure is stored. The steam is generated for instance by the sun or by the hot working fluid that is produced during the operational state of the turbine. Moreover, the thermal heat accumulator device may comprise a phase change material (PCM) that comprises a high heat of fusion, so that heat is absorbed when the material changes from the solid to the liquid state and vice versa. Moreover, the heat accumulator device may comprise a thermo-chemical heat accumulator, wherein thermal energy may be stored by reversible chemical reactions of chemical substances.

According to a further exemplary embodiment, the heat accumulator device is adapted to be charged with thermal energy by an external heat source or by the turbine that is in an operating mode. The external heat source may be for instance the sun or the heated ground (such as sand).

By the present invention, the turbine, in particular specific turbine components such as the rotors, the shaft or the stators, is kept at a minimum temperature level (such as 250-400° Celsius), so that the start-up time may be decreased and the stress for the material of the turbine is reduced because the temperature difference between the operational state and the power off state is reduced as well. Hence, by the above-described heating system higher turbine temperatures are achieved for the morning start-up of the turbine. Together with the heating system, the turbine may be insulated by an insulation system, so that in the morning start-up of the turbine, the turbine components are kept warm with less energy consumption for heating purposes.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

In the following, an exemplary embodiment of the present invention will be specified for further explanation and for better understanding with reference to the attached drawing:

The FIGURE shows a schematic view of a turbine according to an exemplary embodiment of the present invention.

DETAILED DESCRIPTION

The illustration in the drawing is schematically. It is noted that in different figures, similar or identical elements are provided with the same reference signs.

The FIGURE illustrates a turbine 100 for converting thermal energy in mechanical work. The turbine 100 comprises a heating system 101. The heating system 101 is adapted for heating the turbine 100 in a power off state and/or a start-up phase of the turbine 100.

The turbine 100 comprises a housing 102 that surrounds the shaft 103. Rotor blades are typically attached to the shaft 103, wherein stator blades are typically attached to the housing 102 of the turbine.

The FIGURE illustrates two exemplary connecting locations for the heating system 101 with the turbine 100. The heating system 101 may be attached in one exemplary embodiment to the outer surface of the housing 102, so that the thermal energy is transferred from the outside to the inside of the turbine 100. From the housing 102 the thermal energy is transferred to the internal parts of the turbine 100 as well as to the shaft 103.

In a further exemplary embodiment, the heating system 101 may additionally or alternatively connected and/or coupled to inner components of the turbine 100, such as the shaft 103. As shown in the FIGURE, the heating system 101 is thermally and/or mechanically coupled to an end section of the shaft 103. Inside the shaft 103, an internal hole 105 may be provided that extends in an axial direction of the shaft 103. The internal hole 105 extends along the axial direction of the shaft 103 and the internal hole 105 may extend to the middle section of the turbine or throughout the whole shaft 103 in the turbine 100. The thermal energy may be transferred by the heating system 101 inside the shaft 103. The thermal energy may be transferred inside the internal hole 105 for example by hot air, hot steam or by electrical heating elements 106. The electrical heating elements 106 may be installed inside the inner surface of the internal hole 105. In one exemplary embodiment the heating elements 106 may comprise heating coils that extends along the inner surface of the internal hole 105.

The FIGURE further illustrates an insulating system 104 that may comprise insulation mats or insulating materials that may enveloped at least partially the outer surface of the housing 102. Furthermore, the insulating system 104 may comprise insulating materials that may be laminated to the outer or inner surfaces of the turbine components, e.g. to the outer and/or inner surface of the housing 102. Thus, the thermal energy transfer respectively the heat transfer from the inside of the turbine to the colder environment of the turbine may be reduced by the insulating system 104.

The insulating system 104 may also comprise parts of the heating system 101. For example, the insulating system 104 may comprise insulating mats that may be enveloped around the outer surface of the housing 102, wherein inside the insulating mats heating elements 106, such as heating coils, may be installed. Thus, the insulating system 104 is combined with the heating system 101 and thus provides a better insulation for preventing the cooling-off of the turbine 100. Moreover, an additional possibility to keep the temperature inside the turbine 100 and the temperature of the turbine components constant at a minimum temperature level is provided.

A heat accumulator device 107 may be coupled to the inner regions of the turbine in order to extract a part of the working medium for storing and thus for storing the thermal energy.

Additionally, as can be taken from the FIGURE, the heat accumulator device 107 may be connected to the heating system 101. The heat accumulator device 107 may store thermal energy that may be taken from the sun itself, from the working fluid and/or from the heated up ground. Moreover, the thermal energy for the heat accumulator device 107 may be taken from the hot turbine 100 in an operating state. During night times, the stored thermal energy in the heat accumulator device 107 may be transferred to the heating system 101 respectively to the turbine components in order to keep the minimum temperature of the turbine components constant.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A turbine for converting thermal energy into mechanical work, the turbine comprising:
 a heating system,
 wherein the heating system is adapted for heating the turbine in a power off state and a start-up phase of the turbine,
 wherein the heating system comprises a heat accumulator device, wherein the heat accumulator device is configured for storing thermal energy and for transferring the thermal energy to the turbine during the power off state and the start-up phase,
 wherein the heat accumulator device comprises a molten salt thermal energy storage,
 wherein the heat accumulator device is coupled to the turbine to extract a working medium from the turbine during operation of the turbine that provides thermal energy to heat the molten salt thermal energy storage, wherein the heat accumulator transfers said thermal energy back to the turbine during the power-off and start-up phases.

2. The turbine as claimed in claim 1, wherein the heating system comprises an electrical heating device.

3. The turbine as claimed in claim 1, wherein the heating system comprises a steam heating device.

4. The turbine as claimed in claim 1, further comprising, a shaft with an internal hole,
 wherein the heating system is connectable to the internal hole for heating the shaft.

5. The turbine as claimed in claim 4, wherein, the internal hole is aligned along a center axis of the shaft and in a coaxial direction of the shaft.

6. The turbine as claimed in claim 4, wherein the internal hole includes heating elements to provide electrical heating.

7. The turbine as claimed in claim 1, further comprising, a housing,
 wherein the heating system is connectable to the housing.

8. The turbine as claimed in claim 7, wherein the housing includes heating coils that are detachably mounted to an outer surface of the housing.

9. The turbine as claimed in claim 1, further comprising, an insulation system for insulating the turbine in such a way that the cooling rate of the turbine in the power off state is reduced.

10. The turbine as claimed in claim 9, wherein the insulation system includes insulating mats that are attached to the outer surface of the turbine.

11. The turbine as claimed in claim 10, wherein the insulating mats are heated.

12. The turbine as claimed in claim 10, wherein the insulation system further comprises insulating materials, that are formed on an inner or outer surface of the turbine.

13. The turbine as claimed in claim 1, wherein the heat accumulator device is adapted to be charged with thermal energy by an external heat source and/or by the turbine that is in an operating mode.

14. The turbine as claimed in claim 1, wherein a plurality of turbine components are maintained at a minimum temperature level in a range of 250°-400° C.

15. A solar power station, comprising:
a turbine, comprising:
  a heating system,
    wherein the heating system is adapted for heating the turbine in a power off state and a start-up phase of the turbine,
    wherein the heating system comprises a heat accumulator device, wherein the heat accumulator device is configured for storing thermal energy and for transferring the thermal energy to the turbine during the power off state and the start-up phase,
  wherein the heat accumulator device comprises a molten salt thermal energy storage,
  wherein the heat accumulator device is coupled to the turbine to extract a working medium from the turbine during operation of the turbine that provides thermal energy to heat the molten salt thermal energy storage, wherein the heat accumulator transfers said thermal energy back to the turbine during the power-off and start-up phases.

16. A method of operating a turbine for converting thermal energy into mechanical work, the method comprising:
  heating the turbine in a power off state and/or a start-up phase of the turbine using a heating system,
  extracting a working medium from the turbine during operation of the turbine,
  storing thermal energy of the extracted working medium in a heat accumulator device of the heating system, wherein the heat accumulator device comprises a molten salt thermal energy storage which is heated by the thermal energy of the extracted working medium, and
  transferring the stored thermal energy from the heat accumulator to the turbine during the power off state and the start-up phase.

* * * * *